(12) United States Patent
Nolhage

(10) Patent No.: US 9,262,041 B2
(45) Date of Patent: Feb. 16, 2016

(54) METHODS AND APPARATUS FOR DETERMINING A SELECTION REGION

(75) Inventor: Jesper Nolhage, Copenhagen (DK)

(73) Assignee: Nokia Technologies Oy, Espoo (FI)

( * ) Notice: Subject to any disclaimer, the term of this patent is extended or adjusted under 35 U.S.C. 154(b) by 210 days.

(21) Appl. No.: 12/724,719

(22) Filed: Mar. 16, 2010

(65) Prior Publication Data
US 2011/0231756 A1    Sep. 22, 2011

(51) Int. Cl.
*G06F 3/048* (2013.01)
*G06F 3/0481* (2013.01)

(52) U.S. Cl.
CPC ..................... *G06F 3/0481* (2013.01)

(58) Field of Classification Search
CPC ...................................... G06F 3/0482
USPC ......................................... 715/702
See application file for complete search history.

(56) References Cited

U.S. PATENT DOCUMENTS

| | | | | |
|---|---|---|---|---|
| 5,627,567 A * | 5/1997 | Davidson | ............... | G06F 3/0488 345/170 |
| 6,069,625 A | 5/2000 | Nielsen | | |
| 6,643,824 B1 | 11/2003 | Bates et al. | | |
| 7,843,427 B2 * | 11/2010 | Ording | ................ | G06F 3/04812 345/157 |
| 7,844,914 B2 * | 11/2010 | Andre | ..................... | G06F 3/041 715/773 |
| 8,232,973 B2 * | 7/2012 | Kocienda | ............ | G06F 3/04895 345/168 |

| | | | |
|---|---|---|---|
| 2005/0030291 A1 | 2/2005 | Yanagisawa | |
| 2005/0047629 A1 | 3/2005 | Farrell et al. | |
| 2006/0190836 A1 * | 8/2006 | Ling Su | ................ G06F 1/1616 715/773 |
| 2007/0116333 A1 | 5/2007 | Dempski et al. | |

FOREIGN PATENT DOCUMENTS

| | | |
|---|---|---|
| CN | 101442554 A | 5/2009 |
| CN | 101442584 A | 5/2009 |
| EP | 2077493 A2 | 7/2009 |
| EP | 2077490 A2 | 8/2009 |
| WO | 2007094894 A2 | 8/2007 |
| WO | 2008103592 A1 | 8/2008 |
| WO | 2009085335 A1 | 7/2009 |

OTHER PUBLICATIONS

Microsoft Press, "Microsoft Windows User Experience," 1999, pp. xvii and 67-81.*
Wikipedia, "Touchpad," Jun. 2008.*
Hubris Communications, "How to Create Separate User Accounts on One Computer," Jun. 2007.*
Wikipedia, "Laptop," Feb. 2007.*

(Continued)

*Primary Examiner* — Omar Abdul-Ali
(74) *Attorney, Agent, or Firm* — Alston & Bird LLP

(57) ABSTRACT

An apparatus, comprising a processor memory including computer program code, the memory and the computer program code configured to, working with the processor, cause the apparatus to perform at least the following, determining a first usage parameter associated with a first information item, determining graphical representation corresponding to the first information item, wherein the determination is uninfluenced by the first usage parameter, determining a first selection region associated with the first information item, based, at least in part, on the first usage parameter, and causing display of the graphical representation absent indication of the first selection region is disclosed.

22 Claims, 4 Drawing Sheets

(56) References Cited

OTHER PUBLICATIONS

International Search Report and Written Opinion received in corresponding Patent Cooperation Treaty Application No. PCT/IB2011/051109, 11 pages.
Office Action for corresponding Israeli Application No. 221923 dated Jun. 10, 2015.
European Search Report for Application No. 11755773.6, dated Sep. 3, 2013.
Office Action for Chinese Application No. 201180013904.2 date Apr. 15, 2015.
Office Action from Chilean Patent Application No. 2012-002565, dated Jul. 30, 2014.
Office Action from Chinese Patent Application No. 201180013904.2, dated Aug. 20, 2014.

* cited by examiner

METHODS AND APPARATUS FOR DETERMINING A SELECTION REGION

TECHNICAL FIELD

The present application relates generally to input of an electronic apparatus.

BACKGROUND

There has been a recent surge in the use of electronic devices. The user may provide input to the electronic device to perform various operations.

SUMMARY

Various aspects of examples of the invention are set out in the claims.

An apparatus, comprising a processor memory including computer program code, the memory and the computer program code configured to, working with the processor, cause the apparatus to perform at least the following, determining a first usage parameter associated with a first information item, determining graphical representation corresponding to the first information item, wherein the determination is uninfluenced by the first usage parameter, determining a first selection region associated with the first information item, based, at least in part, on the first usage parameter, and causing display of the graphical representation absent indication of the first selection region is disclosed.

A method comprising determining a first usage parameter associated with a first information item, determining graphical representation corresponding to the first information item, wherein the determination is uninfluenced by the first usage parameter, determining a first selection region associated with the first information item, based, at least in part, on the first usage parameter, and causing, by a processor, display of the graphical representation absent indication of the first selection region is disclosed.

A computer-readable medium encoded with instructions that, when executed by a computer, perform determining a first usage parameter associated with a first information item, determining graphical representation corresponding to the first information item, wherein the determination is uninfluenced by the first usage parameter, determining a first selection region associated with the first information item, based, at least in part, on the first usage parameter, and causing display of the graphical representation absent indication of the first selection region is disclosed.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1A:
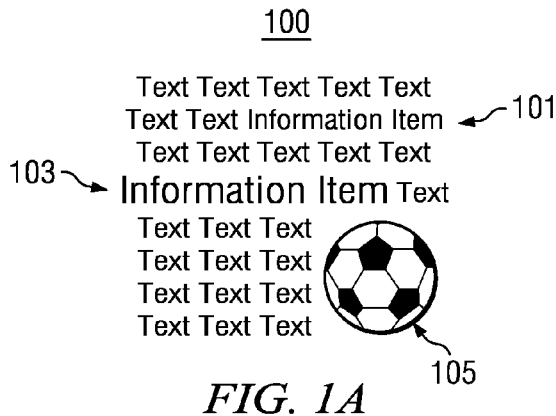
FIGS. 1A-1E are diagrams illustrating selection regions according to at least one example embodiment.

An embodiment of the invention and its potential advantages are understood by referring to FIGS. 1A through 6 of the drawings.

In an example embodiment, a user may have difficulty performing an input with an accurate position. For example, the user may be in an environment that is moving, shaking, vibrating, and/or the like. In another example, the user may have a disability that interferes with accurate position of input, such as Parkinson's disease, multiple sclerosis, and/or the like. In still another example, the user may be performing a touch input with a large contact region, for example, a finger touch input.

In circumstances where the user may have difficulty performing an input with an accurate position, improper association of input to an information item may be reduced by basing a region of input associated with the information item on usage information associated with the information item. For example, the apparatus may associate input that is near a frequently used icon, but does not coincide with the icon, with the icon based, at least in part, on the frequent use of the icon.

In an example embodiment, the user may desire to view small information items while avoiding improper input association. For example, a user may desire to view small text, while desiring to provide accurate finger touch input. Under such circumstances, the apparatus may provide a region where input may be associated with a part of the text. In such an example, the region may be larger than the part of the text associated with the region.

In an example embodiment, the apparatus may provide viewing resolution independently from input resolution. For example, a person with good sight and large fingers may desire high viewing resolution and low input resolution. Under such circumstances, a region associated with an information item may be larger than the information item.

FIGS. 1A-1E are diagrams illustrating selection regions according to at least one example embodiment. The examples of FIGS. 1A-1E are merely examples of selection regions, and do not limit the scope of the claims. For example, number of selection regions may vary, arrangement of the selection regions may vary, position of selection regions may vary, shape of the selection regions may vary, and/or the like.

The examples of FIGS. 1A-1E illustrate graphical representations corresponding to information items. In at least one example embodiment, an information item relates to image information, text information, video information, widget information, icon information, a button, a link, a shortcut, an operation indicator, and/or the like. A link may relate to a uniform resource locator (URL). For example, a link may relate to a webpage, a file, and/or the like. Text information may relate to a character, a group of characters, a word, a group of words, a line of text, a column of text, a block of text, and/or the like. An information item may comprise one or more other information items. For example, an information item may comprise an image information item and a URL information item. In another example, an information item may comprise two blocks of text.

The graphical representation corresponding to an information item may be text, an image, a video, an icon, and/or the like. For example, image graphical representation may correspond to a URL information item. In another example, a text graphical representation may correspond to a URL information item. The graphical representation may vary in size, color, font, orientation, and/or the like. For example, the graphical representation of an information item may be larger than the graphical representation of a different information item. The graphical representation may be based, at least in part, on information associated with the information item. For example, the graphical representation for a video information item may be an image representing a snapshot of the video. In another example, the graphical representation item may be text indicating a link label associated with a URL information item.

In an example embodiment, an apparatus correlates input to the information item using a selection region associated with the information item, similar as described with reference to FIGS. 3A-3D. The selection region may correlate, at least partially, to position of the graphical representation, as illustrated in the examples of FIGS. 1B-1E. The apparatus may cause display of an indication of the selection region or conceal the selection region. For example, an apparatus may conceal the selection region by causing display of the graphical representation absent indication of the selection region.

FIG. 1A illustrates an arrangement 100 of graphical representations 101, 103, and 105 corresponding to information items according to an example embodiment. In the example of FIG. 1A, graphical representations 101 and 103 relate to different information items. Graphical representation 103 is larger than graphical representation 101.

Figure 1B:
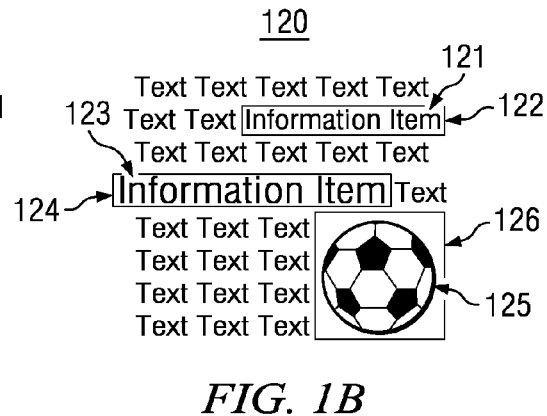

FIG. 1B illustrates an arrangement 120 of graphical representations 121, 123, and 125 corresponding to information items and selection regions 122, 124, and 126 associated with the information items according to an example embodiment. In the example of FIG. 1B, graphical representation 121 correlates to the same information item with which selection region 122 is associated, graphical representation 123 correlates to the same information item with which selection region 124 is associated, and graphical representation 125 correlates to the same information item with which selection region 126 is associated. Graphical representation 123 is larger than graphical representation 121. Likewise, selection region 122 is smaller than selection region 124.

Figure 1C:
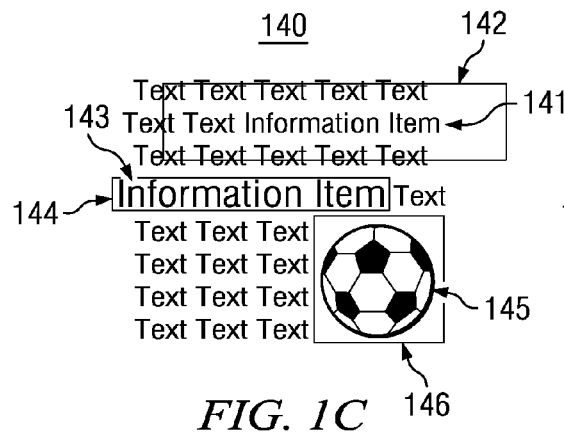

FIG. 1C illustrates an arrangement 140 of graphical representations 141, 143, and 145 corresponding to information items and selection regions 142, 144, and 146 associated with the information items according to an example embodiment. In the example of FIG. 1C, graphical representation 141 correlates to the same information item with which selection region 142 is associated, graphical representation 143 correlates to the same information item with which selection region 144 is associated, and graphical representation 145 correlates to the same information item with which selection region 146 is associated. Graphical representation 143 is larger than graphical representation 141. However, selection region 142 is larger than selection region 144.

Figure 1D:
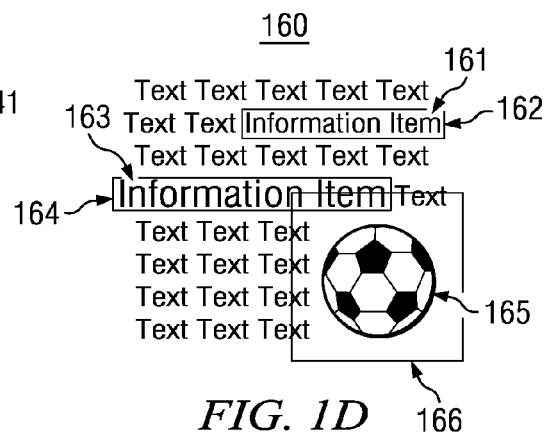

FIG. 1D illustrates an arrangement 160 of graphical representations 161, 163, and 165 corresponding to information items and selection regions 162, 164, and 166 associated with the information items according to an example embodiment. In the example of FIG. 1D, graphical representation 161 correlates to the same information item with which selection region 162 is associated, graphical representation 163 correlates to the same information item with which selection region 164 is associated, and graphical representation 165 correlates to the same information item with which selection region 166 is associated. Graphical representation 163 is larger than graphical representation 161. Likewise, selection region 162 is smaller than selection region 164. Selection region 166 and selection region 164 are proximate to each other and partially coincide.

Figure 1E:
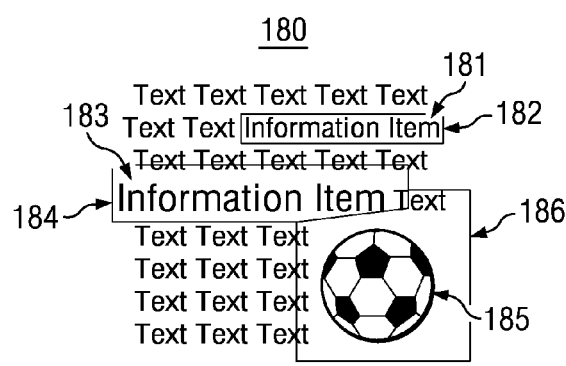

FIG. 1E illustrates an arrangement 180 of graphical representations 181, 183, and 185 corresponding to information items and selection regions 182, 184, and 186 associated with the information items according to an example embodiment. In the example of FIG. 1E, graphical representation 181 correlates to the same information item with which selection region 182 is associated, graphical representation 183 correlates to the same information item with which selection region 184 is associated, and graphical representation 185 correlates to the same information item with which selection region 186 is associated. Graphical representation 183 is larger than graphical representation 181. Selection region 182 is smaller than selection region 184. Selection region 186 and selection region 184 are proximate to each other and partially coincide.

FIGS. 2A-2D are diagrams illustrating selection regions in relation to a usage parameter according to at least one example embodiment. The examples of FIGS. 2A-2D are merely examples of selection regions in relation to a usage parameter, and do not limit the scope of the claims. For example, relation among one or more information items, one or more selection regions, one or more usage parameters, and/or the like, may vary.

In an example embodiment, a usage parameter relates to information associated with past usage of an information item, predicted usage of an information item, importance of an information item, and/or the like. For example, a usage parameter may relate to historical usage information. Historical usage information may relate to past usage of an information item. For example, historical usage information may relate to the number of times an information item has been used, frequency that an information item has been used, time since an information item has been used, and/or the like. In another example, the usage parameter may relate to predicted usage information. Predicted usage information may relate to a determination of likelihood that a user may use the information item. Predicted usage information may be based, at least in part, on rating information, historical information of similar information items, and/or the like.

A usage parameter may be associated with an apparatus, a user, multiple users, and/or the like. For example, historical usage information may be based, at least in part, on historical usage of a device, historical usage associated with an account on the device, historical usage associated with all uses of the information item, and/or the like. For example, the usage parameter may be based, at least in part, on number of times a server has received input associated with usage of the information item. In another example, the usage parameter may be based, at least in part, on ratings stored on an apparatus. In still another example, the usage parameter may be based, at least in part, on number of times a single user has provided input associated with usage of the information item.

Usage of an information item may relate to action associated with the information item. For example, usage may relate to receiving input associated with the information item, similar as described with reference to FIGS. 3A-3D, accessing the information item, and/or the like.

Basis of a usage parameter may be similar and/or may differ across information items. For example, a usage parameter associated with an information item may relate to historical usage information, and a different usage parameter associated with a different information item may relate to predicted usage information.

In an example embodiment, the usage parameter may be based, at least in part, on a calculation associated with the information item. For example, an apparatus may perform a calculation to determine how many times a user has accessed an information item. In such an example, the calculation may relate to the number of times the apparatus has accessed a URL associated with the information item. In another example, an apparatus may perform a calculation to determine likelihood of the apparatus receiving input associated with the information item. For example, the calculation may evaluate historical usage information associated with similar information items.

In an example embodiment, the usage parameter may be based, at least in part, on received usage information associated with the information item. For example, the apparatus may receive usage information indicating ratings provided by other users associated with the information item. In another example, the apparatus may receive historical information associated with the information item.

The examples of FIGS. 2A-2D illustrate a curve associated with the usage parameter in relation to position of the graphical representation. The horizontal axis of FIGS. 2A-2D may relate to any axis of a display. For example, the axis may relate to height, width, or depth. An apparatus may determine the selection region associated with an information item based, at least in part, on the usage parameter. The apparatus may compare the usage parameter to a threshold value in determining the selection region. The threshold value may represent a potential boundary for the selection region. When determining the selection region, an apparatus may evaluate the usage parameter in accordance with multiple axes. For example, the apparatus may evaluate the usage parameter to determine height, width, and/or depth of a selection region. In the examples of FIGS. 2A-2D, the center of the curve associated with the usage parameter corresponds with the center of the graphical representation of the information item.

Although the illustrations of the examples of FIGS. 2A-2D indicate usage parameter as a curve, usage parameter differ and/or vary in shape. For example, the usage parameter may be based, at least in part, on the size of the graphical representation. In such an example, the usage parameter may relate to a scaling factor that may expand the selection region beyond the graphical representation, and/or contract the selection region within the graphical representation.

Figure 2A:
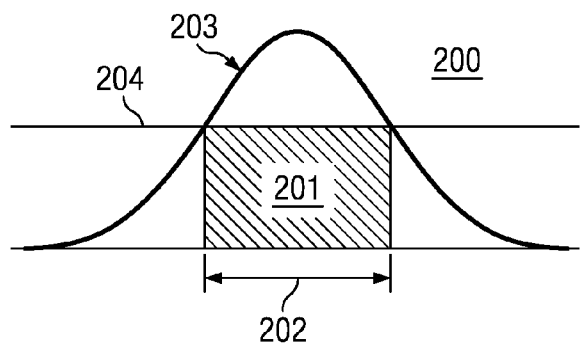
FIGS. 2A-2D are diagrams illustrating selection regions in relation to a usage parameter according to at least one example embodiment.

FIG. 2A illustrates a dimension 201 of a selection region according to an example embodiment. Dimension 201 of the selection region corresponds to a region of usage parameter 203 that surpasses threshold value 204. In the example of FIG. 2A, dimension 201 of the selection region coincides with dimension 202 of the graphical representation, similar as described with reference to selection region 122 and graphical representation 121 of FIG. 1B.

Figure 2B:
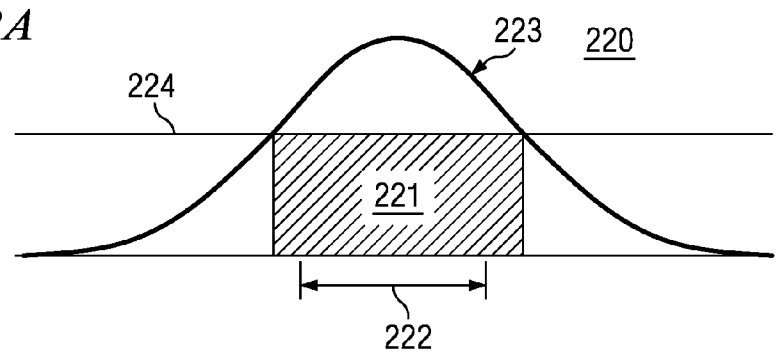

FIG. 2B illustrates a dimension 221 of a selection region according to an example embodiment. Dimension 221 of the selection region corresponds to a region of usage parameter 223 that surpasses threshold value 224. In the example of FIG. 2B, dimension 221 of the selection region surpasses dimension 222 of the graphical representation, similar as described with reference to selection region 142 and graphical representation 141 of FIG. 1C.

Figure 2C:
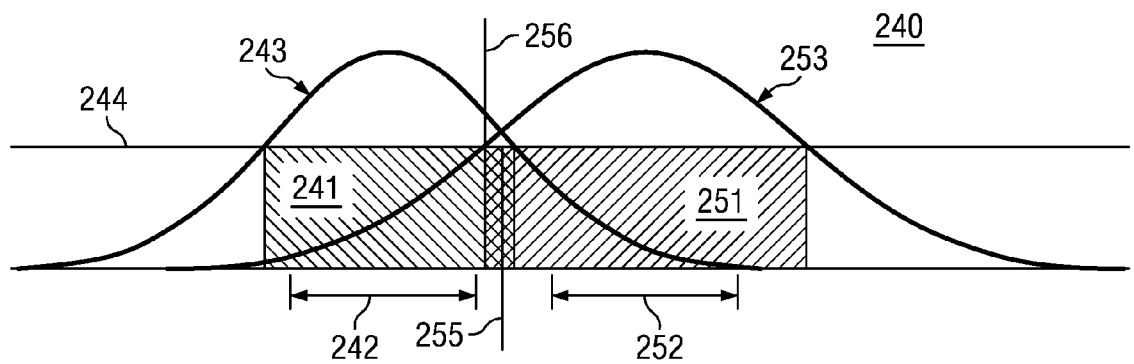

FIG. 2C illustrates a dimension 241 of a first selection region and a dimension 251 of a second selection region according to an example embodiment. Dimension 241 of the first selection region corresponds to a region of usage parameter 243 that surpasses threshold value 244. In the example of FIG. 2C, dimension 241 of the first selection region surpasses dimension 242 of the first graphical representation, similar as described with reference to selection region 142 and graphical representation 141 of FIG. 1C. Dimension 251 of the second selection region corresponds to a region of usage parameter 253 that surpasses threshold value 244. In the example of FIG. 2C, dimension 251 of the second selection region surpasses dimension 252 of the second graphical representation, similar as described with reference to selection region 142 and graphical representation 141 of FIG. 1C.

In an example embodiment, an apparatus determines the first selection region based at least in part, on proximity to the second selection region. In such an example, the apparatus may compare the first usage parameter to the second usage parameter. For example, the apparatus may determine that the boundary between a first selection region and a partially coinciding second selection region corresponds with a position 255 associated with a position where usage parameter 243 is equal to usage parameter 253, similar as described with reference to selection regions 184 and 186 of FIG. 1E. In another example, the apparatus may determine that the boundary between a first selection region and a partially coinciding second selection region corresponds with a position 256 associated with the boundary of the larger selection region, the boundary of the selection region with the larger usage parameter, and/or the like.

Figure 2D:
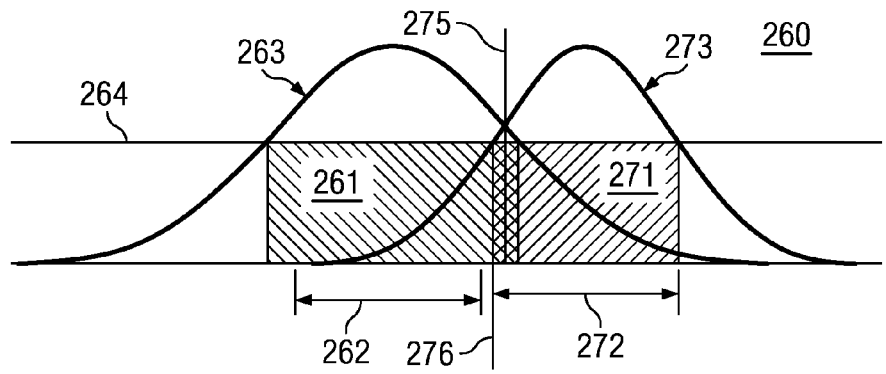

FIG. 2D illustrates a dimension 261 of a first selection region and a dimension 271 of a second selection region according to an example embodiment. Dimension 261 of the first selection region corresponds to a region of usage parameter 263 that surpasses threshold value 264. In the example of FIG. 2D, dimension 261 of the first selection region surpasses dimension 262 of the first graphical representation, similar as described with reference to selection region 142 and graphical representation 141 of FIG. 1C. Dimension 271 of the second selection region corresponds to a region of usage parameter 273 that surpasses threshold value 264. In the example of FIG. 2D, dimension 271 of the second selection region corresponds with dimension 272 of the second graphical representation, similar as described with reference to selection region 122 and graphical representation 121 of FIG. 1B.

In an example embodiment, an apparatus determines the first selection region based at least in part, on proximity to the second selection region. In such an example, the apparatus may compare the first usage parameter to the second usage parameter. For example, the apparatus may determine that the boundary between a first selection region and a partially coinciding second selection region corresponds with a position 275 associated with a position where usage parameter 263 is equal to usage parameter 273, similar as described with reference to selection regions 184 and 186 of FIG. 1E. In another example, the apparatus may determine that the boundary between a first selection region and a partially coinciding second selection region corresponds with a position 276 associated with the boundary of the graphical representation that coincides with the first selection region and the second selection region.

FIGS. 3A-3D are diagrams illustrating selection regions in relation to indication of an input according to at least one example embodiment. The examples of FIGS. 3A-3D are merely examples of selection regions in relation to indication of an input, and do not limit the scope of the claims. For example, relation among one or more selection regions, one or more usage parameters, and/or the like, may vary.

In an example embodiment, an input may relate to a touch input a cursor input, a key press input, a button press input, gesture input, visual input, motion input, and/or the like. For example, the input may relate to a touch input associated with a position. In another example embodiment, the input may relate to a key press associated with a cursor position.

Figure 3A:
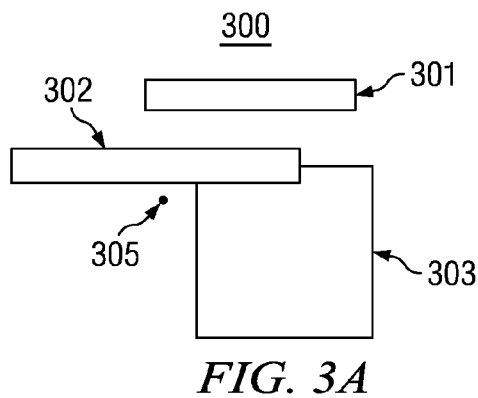
FIGS. 3A-3D are diagrams illustrating selection regions in relation to indication of an input according to at least one example embodiment.

FIG. 3A illustrates a position 305 associated with an input in relation to selection regions 301, 302, and 303 according to an example embodiment. In the example of FIG. 3A, position 305 is indicated by a point. The point may relate to a tip of a cursor, a stylus touch input, and/or the like. However, at least one example embodiment may differ regarding size, shape, position, and/or the like, of the indication of the input. Position 305 is entirely outside of selection regions 301, 302, and 303. An apparatus may determine that the input associated with position 305 does not correspond with any one of selection regions 301, 302, or 303 based, at least in part, on determining that position 305 is entirely outside of selection regions 301, 302, and 303.

Figure 3B:
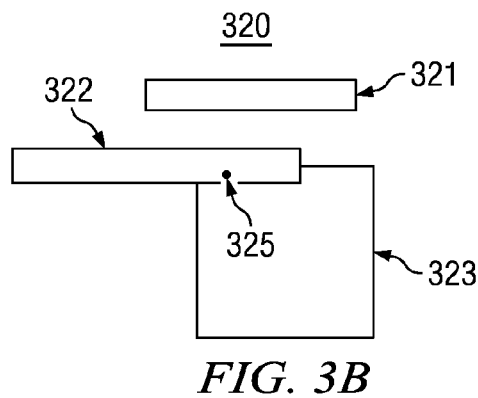

FIG. 3B illustrates a position 325 associated with an input in relation to selection regions 321, 322, and 323 according to an example embodiment. In the example of FIG. 3B, position 325 is indicated by a point. The point may relate to a tip of a cursor, a stylus touch input, and/or the like. However, at least one example embodiment may differ regarding size, shape, position, and/or the like, of the indication of the input. Position 325 is entirely within selection region 322, and entirely outside of selection regions 321 and 323. An apparatus may determine that the input associated with position 325 corresponds with selection region 322 based, at least in part, on determining that position 325 is entirely within selection region 322.

Figure 3C:
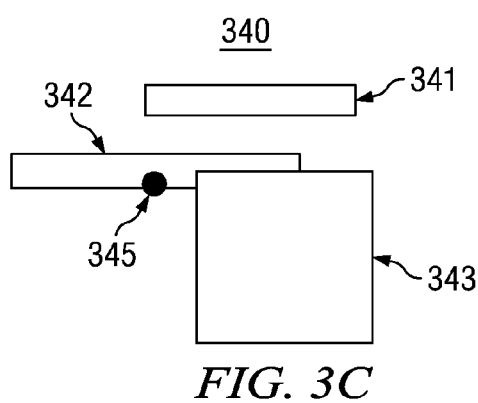

FIG. 3C illustrates a position 345 associated with an input in relation to selection regions 341, 342, and 343 according to an example embodiment. In the example of FIG. 3C, position 345 is indicated by an input region. The input region may relate to a contact region associated with a body of a cursor, a finger touch input, and/or the like. However, at least one example embodiment may differ regarding size, shape, position, and/or the like, of the indication of the input. Position 345 is partially within selection region 342, and entirely outside of selection regions 341 and 343. An apparatus may determine that the input associated with position 345 corresponds with selection region 342 based, at least in part, on determining that at least part of position 345 coincides with at least part of selection region 342.

Figure 3D:
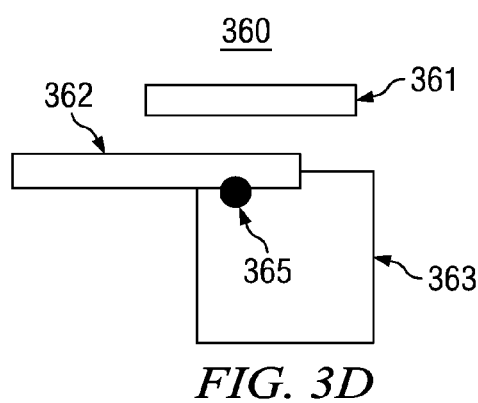

FIG. 3D illustrates a position 365 associated with an input in relation to selection regions 361, 362, and 363 according to an example embodiment. In the example of FIG. 3D, position 365 is indicated by an input region. The input region may relate to a contact region of a body of a cursor, a finger touch input, and/or the like. However, at least one example embodiment may differ regarding size, shape, position, and/or the like, of the indication of the input. Position 365 is partially within selection region 362, partially within selection region 363, and entirely outside of selection regions 361. An apparatus may determine that the input associated with position 365 corresponds with selection region 362 based, at least in part, on determining that at least part of position 365 coincides with at least part of selection region 362. Likewise, an apparatus may determine that the input associated with position 365 corresponds with selection region 363 based, at least in part, on determining that at least part of position 365 coincides with at least part of selection region 363. Furthermore, an apparatus may determine that the input associated with position 365 corresponds with selection region 363 based, at least in part, on determining that a majority of position 365 coincides with at least part of selection region 363.

Figure 6:
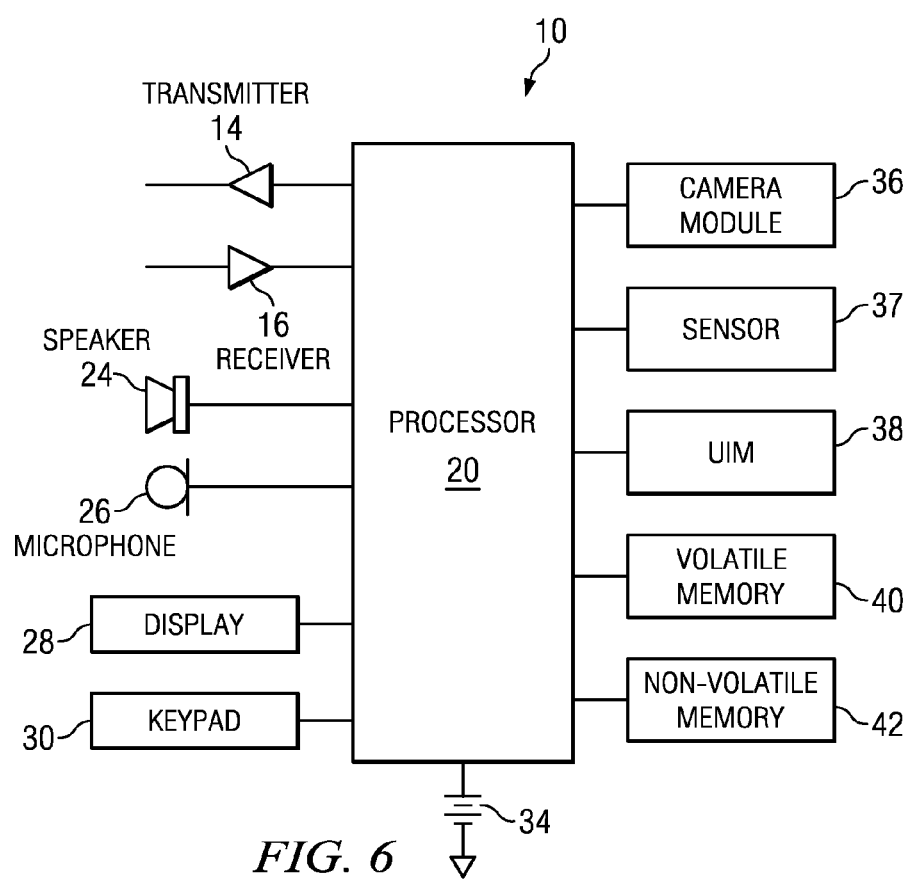
FIG. 6 is a block diagram showing an apparatus according to at least one example embodiment.
Figure 4:
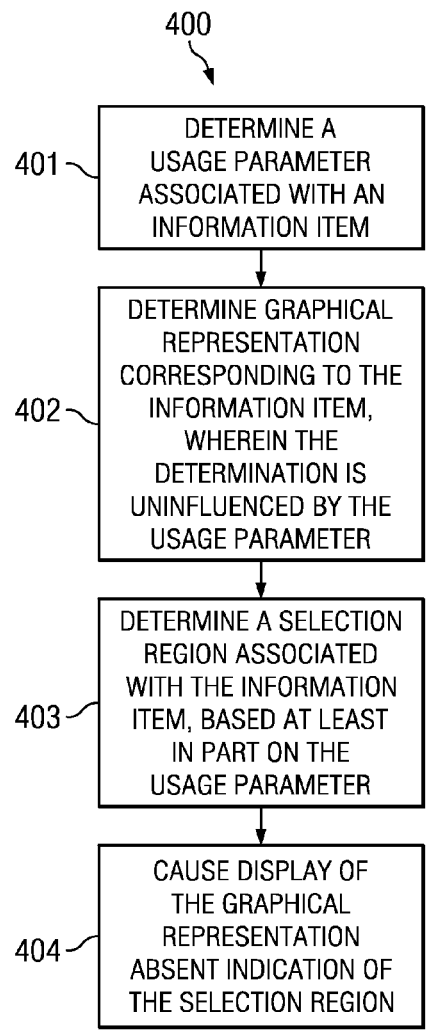
FIG. 4 is a flow diagram showing a set of operations for determining a selection region according to at least one example embodiment.

FIG. 4 is a flow diagram showing a set of operations 400 for determining a selection region according to at least one example embodiment. An apparatus, for example electronic device 10 of FIG. 6 or a portion thereof, may utilize the set of operations 400. The apparatus may comprise means, including, for example processor 20 of FIG. 6, for performing the operations of FIG. 4. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 400.

At block 401, the apparatus determines a usage parameter associated with an information item. The apparatus may determine the usage parameter by receiving usage information, by performing a calculation regarding usage information, and/or the like. The information item may be similar as described with reference to FIGS. 1A-1E. The usage parameter and the usage parameter's association with the information item may be similar as described with reference to FIGS. 2A-2D.

At block 402, the apparatus determines graphical representation corresponding to the information item, wherein the determination is uninfluenced by the usage parameter. The graphical representation, and the graphical representation's correspondence with the information item may be similar as described with reference to FIGS. 1A-1E. The apparatus may base determination of the graphical representation on information associated with the information item, as described with reference to FIGS. 1A-1E. However, when determining the graphical representation, the determination is uninfluenced by the usage parameter. For example, the determination may exclude the usage parameter in a calculation associated with determining the graphical representation. In another example, the apparatus may omit the usage parameter from determination of the graphical representation. In at least one example embodiment, the apparatus determines the graphical representation uninfluenced by the usage parameter, but influenced by a different usage parameter. For example, the usage parameter may relate to usage information acquired by the apparatus associated users of the apparatus. In such an example, the apparatus may determine the graphical information based, at least in part, on usage information received from a server associated with users of the server, uninfluenced by usage information acquired by the apparatus associated users of the apparatus.

At block 403, the apparatus determines a selection region associated with the information item, based, at least in part, on the usage parameter. The selection region and the selection region's association with the information item may be similar as described with reference to FIGS. 1A-1E. The determination of the selection region may be similar as described with reference to FIGS. 2A-2D.

At block 404, the apparatus causes display of the graphical representation absent indication of the selection region similar as described with reference to FIGS. 1A-1E. The apparatus may cause display of the graphical information on a display comprised by the apparatus, such as display 28 of FIG. 6, on a display external to the apparatus, such as a monitor, and/or the like. The apparatus may cause display of the graphical representation by performing operations, sending information to another device, and/or the like. Without limiting the claims in any way, one possible technical effect of displaying the graphical representation absent indication of the selection region is to allow a user to determine viewing resolution independently from input resolution. Without limiting the claims in any way, another possible technical effect is to reduce the number of improper associations of inputs to information items while avoiding changes to representation of the information items.

Figure 5:
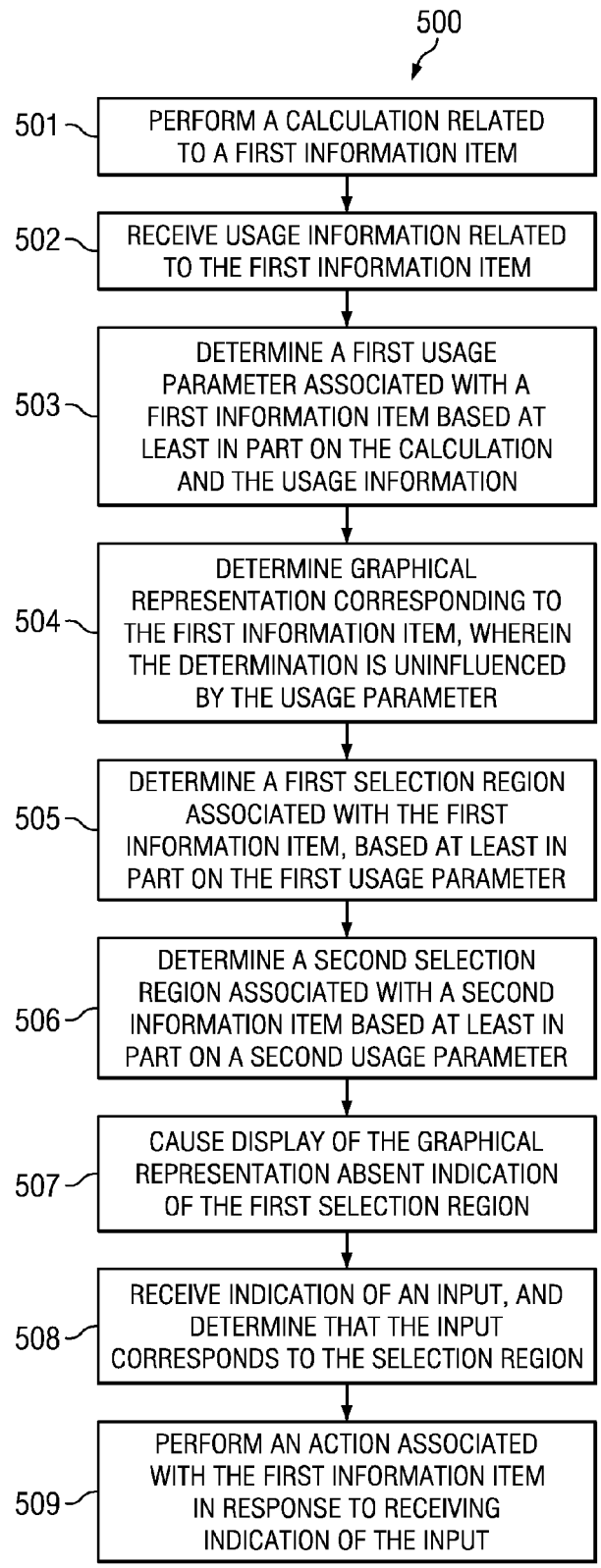
FIG. 5 is a flow diagram showing a set of operations for determining a selection region according to at least one example embodiment.

FIG. 5 is a flow diagram showing a set of operations 500 for determining a selection region according to at least one example embodiment. An apparatus, for example electronic device 10 of FIG. 6 or a portion thereof, may utilize the set of operations 500. The apparatus may comprise means, including, for example processor 20 of FIG. 6, for performing the operations of FIG. 5. In an example embodiment, an apparatus, for example device 10 of FIG. 6, is transformed by having memory, for example memory 42 of FIG. 6, comprising computer code configured to, working with a processor, for example processor 20 of FIG. 6, cause the apparatus to perform set of operations 500.

At block 501, the apparatus performs a calculation related to the first information item, and basing the first usage parameter, at least in part, on the calculation. The calculation and basing the first usage parameter may be similar as described with reference to FIGS. 2A-2D.

At block 502, the apparatus receives usage information related to the first information item, and basing the first usage parameter on the usage information. The receiving of usage information and basing the first usage parameter on the usage information may be similar as described with reference to FIGS. 2A-2D.

At block 503, the apparatus determines a first usage parameter associated with a first information item based, at least in part, on the calculation and the usage information similar as described with reference to block 401 of FIG. 4.

At block 504, the apparatus determines graphical representation corresponding to the first information item, wherein the determination is uninfluenced by the usage parameter similar as described with reference to block 402 of FIG. 4.

At block 505, the apparatus determines a first selection region associated with the first information item, based at least in part on the first usage parameter similar as described with reference to block 403 of FIG. 4.

At block 506, the apparatus determines a second selection region associated with a second information item based, at least in part, on a second usage parameter similar as described with reference to block 403 of FIG. 4.

At block 507, the apparatus causes display of the graphical representation absent indication of the first selection region similar as described with reference to block 404 of FIG. 4.

At block 508, the apparatus receives indication of an input, and determine that the input corresponds to the selection region. The input, the input's correspondence to the selection region, and determination that the input corresponds to the selection region may be similar as described with reference to FIGS. 3A-3D. The apparatus may receive indication of the input by retrieving information from one or more memories, such as non-volatile memory 42 of FIG. 6, receiving one or more indications of the input from a part of the apparatus, such as a touch display, for example display 28 of FIG. 6, receiving indication of the input from a receiver, such as receiver 16 of FIG. 6, receiving input from a keypad, such as keypad 30 of FIG. 6, and/or the like. In an example embodiment, the apparatus receives the indication of the input from a different apparatus, such as a mouse, a keyboard, an external touch display, and/or the like.

At block 509, the apparatus performs an action associated with the first information item in response to receiving indication of the input. The action may relate to selecting the first information item, opening the first information item, modifying the first information item, rendering the first information item, and/or the like. For example, if the information item is a video, the action may relate to playing the video, viewing metadata associated with the video, and/or the like.

FIG. 6 is a block diagram showing an apparatus, such as an electronic device 10, according to at least one example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-5. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-5. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-6. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. Display 28 may be display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-6. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 6 illustrates an example of an electronic device that may utilize embodiments of the invention including those described and depicted, for example, in FIGS. 1-6, electronic device 10 of FIG. 6 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 6. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 401 of FIG. 4 may be performed after block 402. In another example, block 404 of FIG. 4 may be performed prior to block 403. Furthermore, if desired, one or more of the above-described functions may be optional or may be combined. For example, block 502 of FIG. 5 may be optional or combined with block 503.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
a processor;
memory including computer program code, the memory and the computer program code configured to, working with the processor, cause the apparatus to perform at least the following:
prior to receiving user input selecting a first information item, determining a first usage parameter associated with the first information item, wherein determining the first usage parameter comprises calculating the first usage parameter based upon past usage of the first information item or predicted usage of the first information item;
determining graphical representation corresponding to the first information item, wherein the determination is uninfluenced by the first usage parameter;
prior to receiving the user input selecting the first information item, determining a first selection region associated with the first information item, and configured to subsequently receive user input selecting the first information item, wherein the first selection region has a size that is determined prior to receiving the user input selecting the first information item and that is configured to vary based, at least in part, on a relationship of the first usage parameter to a threshold value prior to receiving the user input selecting the first information item; and
causing display of the graphical representation without concurrently displaying the first selection region.

2. The apparatus of claim 1, wherein the memory and the computer program code are further configured to, working with the processor, cause the apparatus to further perform at least receiving indication of an input, and determine that the input corresponds to the selection region.

3. The apparatus of claim 2, wherein determining that the input corresponds to the selection region comprises determining that at least part of a position associated with the input coincides with at least part of the first selection region.

4. The apparatus of claim 2, wherein the input is a touch input.

5. The apparatus of claim 2, wherein the memory and the computer program code are further configured to, working with the processor, cause the apparatus to further perform at least performing an action associated with the first information item in response to receiving indication of the input.

6. The apparatus of claim 1, wherein the first usage parameter relates to historical usage information.

7. The apparatus of claim 6, wherein the historical usage information is associated with an account.

8. The apparatus of claim 6, wherein the historical usage information is associated with the apparatus.

9. The apparatus of claim 1, wherein the memory and the computer program code are further configured to, working with the processor, cause the apparatus to further perform at least receiving usage information related to the first information item, and basing the first usage parameter on the usage information.

10. The apparatus of claim 1, wherein the memory and the computer program code are further configured to, working with the processor, cause the apparatus to further perform at least determining a second selection region associated with a second information item based, at least in part, on a second usage parameter.

11. The apparatus of claim 10, wherein determining the first selection region is based, at least in part, on proximity to the second selection region.

12. The apparatus of claim 10, wherein the first usage parameter and the second usage parameter relate to the same basis.

13. The apparatus of claim 10, wherein the first selection region is determined based, at least in part on a comparison of the first usage parameter and the second usage parameter.

14. The apparatus of claim 1, wherein the determination of the first selection region is based, at least in part, on comparing the usage parameter to a threshold value.

15. The apparatus of claim 1, wherein the determination of the first selection region is based, at least in part, on size of the graphical representation.

16. The apparatus of claim 1, wherein the apparatus is a mobile device.

17. The apparatus of claim 1, wherein the apparatus further comprises a display.

18. The apparatus of claim 1, wherein the memory and the computer program code are configured to, working with the processor, cause the apparatus to determine the first selection region by determining the first selection region associated with the first information item to have a size that is different than the graphical representation corresponding to the first information item.

19. A method, comprising:
prior to receiving user input selecting a first information item determining a first usage parameter associated with a first information item; wherein determining the first usage parameter comprises calculating the first usage parameter based upon past usage of the first information item or predicted usage of the first information item;
determining graphical representation corresponding to the first information item, wherein the determination is uninfluenced by the first usage parameter;
prior to receiving the user input selecting the first information item, determining a first selection region associated with the first information item and configured to subsequently receive user input selecting the first information item, wherein the first selection region has a size that is determined prior to receiving the user input selecting the first information item and that is configured to vary based, at least in part, on a relation of the first usage parameter to a threshold value prior to receiving the user input selecting the first information item; and
causing, by a processor, display of the graphical representation without concurrently displaying the first selection region.

20. The method of claim 19, wherein determining the first selection region comprises determining the first selection region associated with the first information item to have a size that is different than the graphical representation corresponding to the first information item.

21. A computer-readable medium encoded with instructions that, when executed by a computer, perform:
prior to receiving user input selecting a first information item, determining a first usage parameter associated with the first information item, wherein the determining first usage parameter comprises calculating the first usage parameter based upon past usage of the first information item or predicted usage of the first information item;
determining graphical representation corresponding to the first information item, wherein the determination is uninfluenced by the first usage parameter;
prior to receiving the user input selecting the first information item, determining a first selection region associated with the first information item and configured to subsequently receive user input selecting the first information item, wherein the first selection region has a, size that is determined prior to receiving the user input selecting the first information item and that is configured to vary based, at least in part, on a relationship of the first usage parameter to a threshold value prior to receiving the user input selecting the first information item; and
causing display of the graphical representation without concurrently displaying the first selection region.

22. The computer-readable medium of claim 21, wherein the instructions, when executed by the computer, determine the first selection region by determining the first selection region associated with the first information item to have a size that is different that the graphical representation corresponding to the first information item.

* * * * *